(12) United States Patent
Leuthen et al.

(10) Patent No.: US 7,040,391 B2
(45) Date of Patent: May 9, 2006

(54) LOW HARMONIC DIODE CLAMPED CONVERTER/INVERTER

(75) Inventors: John Michael Leuthen, Claremore, OK (US); Fang Zheng Peng, Okemos, MI (US)

(73) Assignee: Baker Hughes Incorporated, Houston, TX (US)

( * ) Notice: Subject to any disclaimer, the term of this patent is extended or adjusted under 35 U.S.C. 154(b) by 120 days.

(21) Appl. No.: 10/610,438

(22) Filed: Jun. 30, 2003

(65) Prior Publication Data

US 2004/0267468 A1 Dec. 30, 2004

(51) Int. Cl.
E21B 43/00 (2006.01)

(52) U.S. Cl. .................. 166/65.1; 166/66.4; 166/68
(58) Field of Classification Search ............... 166/65.1, 166/66.4, 68
See application file for complete search history.

(56) References Cited

U.S. PATENT DOCUMENTS

| | | | |
|---|---|---|---|
| 5,642,275 A | 6/1997 | Peng et al. | |
| 5,644,483 A | 7/1997 | Peng et al. | |
| 6,075,350 A | 6/2000 | Peng | |
| 6,135,732 A * | 10/2000 | Angorin | 417/423.3 |
| 6,459,596 B1 | 10/2002 | Corzine | |

FOREIGN PATENT DOCUMENTS

GB 2 369 759 6/2002

OTHER PUBLICATIONS

Ishida, Takashi, et al., "A Control Strategy for a Five-Level Double Converter with Adjustable DC Link Voltage," Conference Record of the 2002 IEEE Industry Applications Conference, 37th IAS Annual Meeting, Pittsburgh, PA, Oct. 13-18, 2002, Conference Record of the IEEE Industry Applications Conference, IAS Annual Meeting, New York, N.Y., IEEE, U.S., vol. 1 of 4, Conf. 37, Oct. 13, 2002, pp. 530-536. XP010610270.

Miyamoto, Tetsuya, et al., "Control Strategy of a Three-Phase Five-Level Double Converter with Adjustable DC Voltage for Induction Motor Drives," Power Conversion Conference, 2002, Proceedings of the Osaka, Japan, Apr. 2-5, 2002, Piscatawa, N.J., U.S.A., IEEE, Apr. 2, 2002, pp. 378-383.

Lai, Jih-Sheng, "Multilevel Converters—A New Breed of Power Converters," IEEE Transactions on Industry Applications, IEEE, Inc., New York, U.S., vol. 32, No. 3, May 1, 1996, pp. 509-517.

Ishida, Takashi, et al., "Characteristics of a Five-Level Double Converter for Induction Motor Drive," EPE 2001, 9th European Conference on Power Electronics and Applications (CD-ROM Version), Graz, Aug. 27-29, 2001, European Conference on Power Electronics and Applications, Brussels, EPE Association, BE, 2001, pp. 1-9.

* cited by examiner

Primary Examiner—Frank S. Tsay (57) ABSTRACT

First and second networks of switching devices, each of which are an insulated gate bipolar transistor with an intrinsic reverse-biased clamping diode, are controlled to selectively connect a sinusoidal input voltage and an output to different nodes within a series of capacitors during different portions of input and output voltage cycles to produce a stepped sinusoidal output voltage. The topology requires a low part count, produces relatively low harmonics without filtering when powering artificial lift equipment within a borehole, and scales up to medium voltages without a step-up transformer. During variable speed operation of the lift equipment, optimized switching angles for controlling the switching devices during the voltage cycles may be selected based on modulation producing the desired speed and phase measurements.

22 Claims, 4 Drawing Sheets

LOW HARMONIC DIODE CLAMPED CONVERTER/INVERTER

TECHNICAL FIELD OF THE INVENTION

The present invention is directed, in general, to borehole production power systems and, more specifically, to low harmonic borehole production power systems allowing variable speed operation of artificial lift equipment.

BACKGROUND OF THE INVENTION

In borehole production systems that employ artificial lift equipment such as electrical submersible pumps (ESPs), variable speed operation is typically achieved by either quasi-sine wave "six-step" modulation, which produces fifth and seventh harmonics of significant magnitude, or pulse width modulated (PWM) drives, in which sinusoidal load currents are produced by varying the "width" or duration of high frequency square waves in order to vary the operating speed of a motor coupled to the drive via a power cable and, optionally, a step-up transformer.

However, pulse width modulation often produces ringing or resonance in the transmitted power, resulting in extremely high peak voltages that may, over time, degrade or destroy the power cable insulation, cause vibration damage to the pump, or cause other undesirable side effects. Sine wave filters used to smooth the pulse width modulated output are expensive and complex.

There is, therefore, a need in the art for improved system of powering artificial lift equipment within a borehole in a manner allowing variable speed operation.

SUMMARY OF THE INVENTION

To address the above-discussed deficiencies of the prior art, it is a primary object of the present invention to provide, for use in a borehole production system, first and second networks of switching devices, each of which are an insulated gate bipolar transistor with an intrinsic reverse-biased clamping diode, that are controlled to selectively connect a sinusoidal input voltage and an output to different nodes within a series of capacitors during different portions of input and output voltage cycles to produce a stepped sinusoidal output voltage. The topology requires a low part count, produces relatively low harmonics without filtering when powering artificial lift equipment within the borehole, and scales up to medium voltages without a step-up transformer. During variable speed operation of the lift equipment, optimized switching angles for controlling the switching devices during the voltage cycles may be selected based on modulation producing the desired speed and phase measurements.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
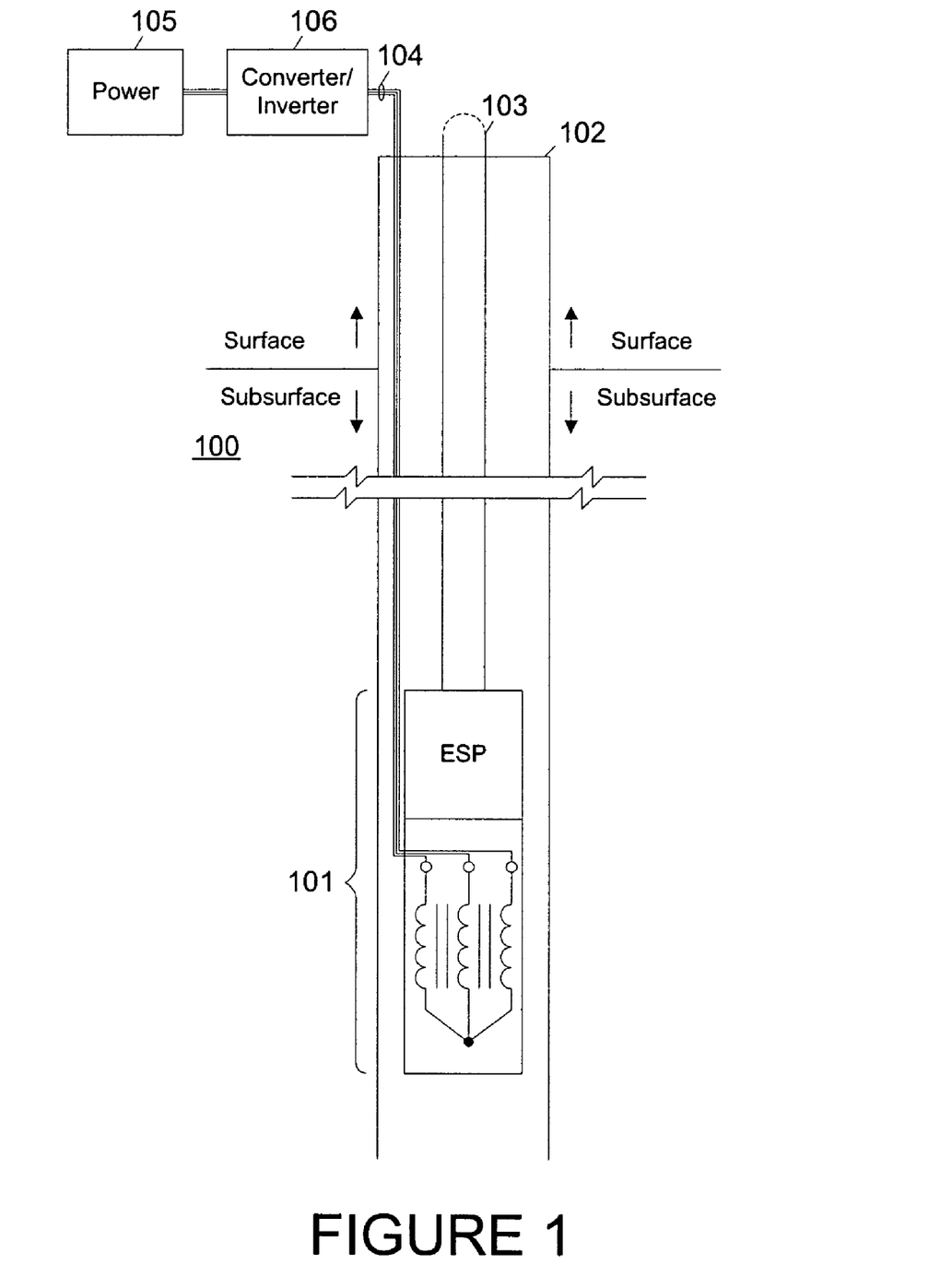
FIG. 1 depicts a borehole production system including a converter/inverter system according to one embodiment of the present invention.

FIG. 1 depicts a borehole production system including a converter/inverter system according to one embodiment of the present invention. Borehole production system 100 includes an electrical submersible pump and motor assembly 101 lowered into a borehole 102 using a production tubing string 103. A three-phase power cable 104 carries three-phase power into the borehole 102 to the motor within assembly 101 from a surface location.

At the surface, a three-phase power source 105, such as a generator or a connection to a local power grid, is coupled to power cable 104 by a converter/inverter system 106. Converter/inverter system 106 is constructed and operates in the manner described below to regulate the operating speed of the motor/pump assembly.

Those skilled in the art will recognize that the complete structure and operation of a borehole production system is not depicted in the drawings or described herein. Instead, for simplicity or clarity, only so much of the borehole production system as is unique to the present invention or necessary for an understanding of the present invention is depicted and described.

Figure 2:
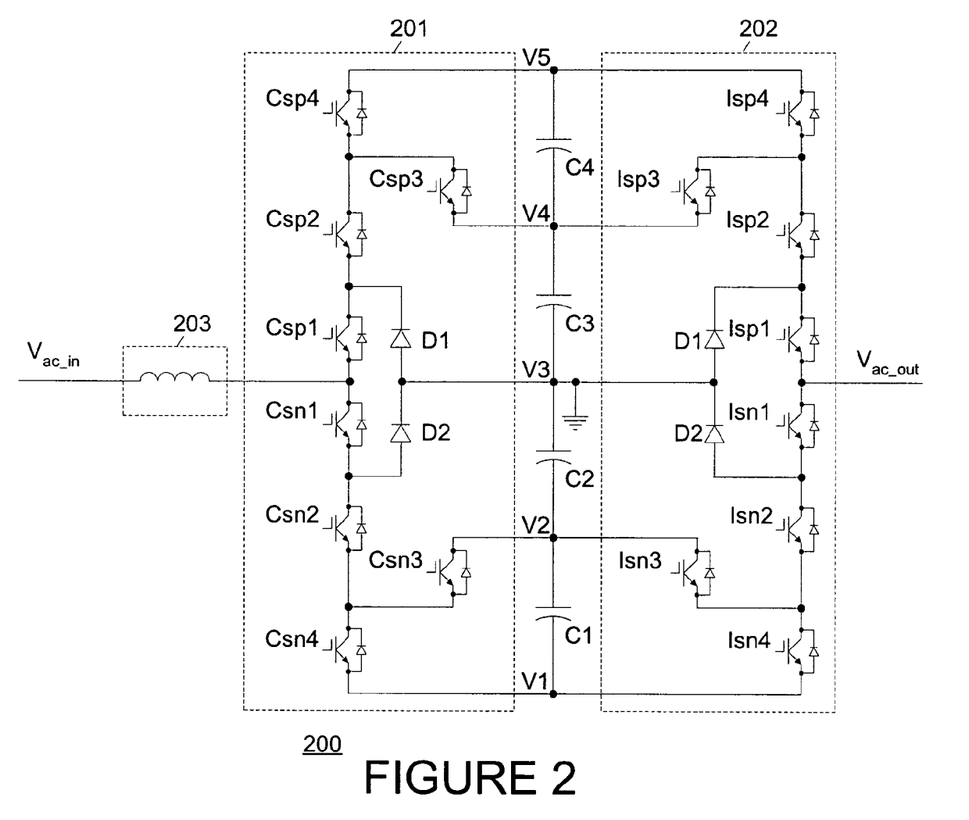
FIG. 2 is a circuit diagram for a main circuit structure employed within a converter/inverter system according to one embodiment of the present invention.

FIG. 2 is a circuit diagram for a main circuit structure employed within a converter/inverter system according to one embodiment of the present invention. A discrete implementation of the circuit depicted is employed for each phase of the three-phase power system including power source 105, power cable 104 and the motor within motor/pump assembly 101.

Circuit 200 is a simplified topology multi-level converter/inverter including a plurality of series-connected electrical energy storage devices, capacitors C1–C4 in the exemplary embodiment, defining nodes V1–V5 each having distinct steady-state voltage levels, preferably of relatively fixed value, at the terminals thereof. Networks 201 and 202 of switching devices selectively connect nodes V1–V5 to a conductor carrying a sinusoidal input voltage $V_{ac\_in}$ and to a conductor for an output voltage $V_{ac\_out}$ based on control or switching signals Csp1–Csp4, Csn1–Csn4, Isp1–Isp4, and Isn1–Isn4.

In the exemplary embodiment, the switching devices (which are referenced in FIG. 2 by the switching signals Csp1–Csp4, Csn1–Csn4, Isp1–Isp4, and Isn1–Isn4 received by the corresponding switching device) within networks 201 and 202 are npn insulated gate bipolar transistors (IGBTs) each having an intrinsic diode connected with reverse bias orientation across the anode and cathode (or source/drain or emitter/collector) of the IBGT. That is, the anode of the intrinsic diode is connected to the cathode or emitter of the IGBT, while the cathode of the intrinsic diode is connected to the anode or collector of the IGBT.

Switching devices Csp4, Csp2, Csp1, Csn1, Csn2 and Csn4 are connected in series within network 201, and switching devices Isp4, Isp2, Isp1, Isn1, Isn2 and Isn4 are connected in series within network 202, where the collectors of devices Csp4 and Isp4 within both networks 201 and 202 are connected to node V5 and the emitters of devices Csp4 and Isp4 within both networks 201 and 202 are connected to node V1. Switching devices Csp3 and Isp3 within both networks 201 and 202 are connected between the emitters of devices Csp4 and Isp4 within the respective network 201 or 202 and node V4, while switching devices Csn3 and Isn3 within both networks 201 and 202 are connected between the collectors of devices Csn4 and Isn4 within the respective network 201 and 202 and node V2.

The conductor carrying the sinusoidal input voltage $V_{ac\_in}$ for the power phase operated on by circuit 200 is connected, via a phase shifting device 203 (an inductor in the example depicted), to the junction within network 201 between the emitter of device Csp1 and the collector of device Csn1. The conductor carrying the stepped sinusoidal output voltage $V_{ac\_out}$ for the corresponding power phase is connected to the junction within network 202 between the emitter of device Isp1 and the collector of device Isn1.

Each network 201 and 202 within circuit 200 also includes series-connected diodes D1 and D2 having a common forward bias orientation and connected in parallel with a reverse bias orientation across switching devices Csp1 and Csn1 or Isp1 and Isn1, to the collector of device Csp1 or Isp1 and to the emitter of device Csn1 or Isn1. The junction between diodes D1 and D2 within each of networks 201 and 202 is connected to node V3, which is a grounded node in the example depicted.

Figure 3:
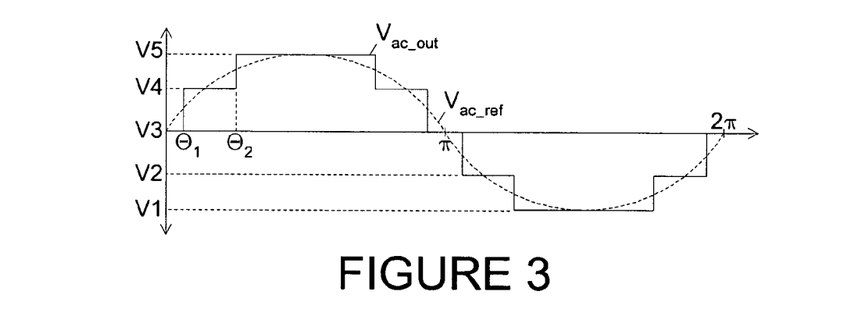
FIG. 3 illustrates an output voltage waveform for one power phase from a converter/inverter system according to one embodiment of the present invention.

FIG. 3 illustrates an output voltage waveform for one power phase from a converter/inverter system according to one embodiment of the present invention. The output voltage $V_{ac\_out}$ of circuit 200 has a stepped sinusoidal waveform modeled after, and illustrated in comparison with, a "pure" sinusoidal waveform $V_{ac\_ref}$. The output voltage $V_{ac\_out}$ is switched between a number of voltage levels (five in the example shown) with a timing determined by two switching parameters, switching angles $\theta_1$ and $\theta_2$.

In the single cycle illustrated in FIG. 3, the output voltage $V_{ac\_out}$ begins at a neutral or ground voltage level V3 (although voltage level or node V3 need not necessarily be grounded) and is initially switched to a first positive voltage level V4 at a point during the cycle corresponding to switching angle $\theta_1$, then is switched to a second positive voltage level V5 greater than the first positive voltage level V4 at a point during the cycle corresponding to switching angle $\theta_2$. The output voltage $V_{ac\_out}$ is dropped to the first positive voltage level V4 at a point during the cycle corresponding to $\pi-\theta_2$, and then to the neutral or grounded voltage level V3 at a point during the cycle corresponding to $\pi-\theta_1$. The output voltage $V_{ac\_out}$ is maintained at the neutral or grounded voltage level V3 through the end of the positive half of the cycle.

During the negative half of the cycle, the output voltage $V_{ac\_out}$ similarly begins at the neutral or ground voltage level V3 and is initially switched to a first negative voltage level V2 at a point during the cycle corresponding to $\pi+\theta_1$. The output voltage $V_{ac\_out}$ is switched to a second negative voltage level V1, having a greater magnitude than the first negative voltage level V2, at a point during the cycle corresponding to $\pi+\theta_2$, then is switched back to the first negative voltage level V2 at a point during the cycle corresponding to $2\pi-\theta_2$. The output voltage $V_{ac\_out}$ is returned to the neutral or grounded voltage level V3 at a point during the cycle corresponding to $2\pi-\theta_1$, and maintained at that voltage level V3 through the end of the negative half of the cycle.

Circuit 200 produces the output voltage $V_{ac\_out}$ depicted in FIG. 3 by asserting control signals applied to switching networks 201 and 202 in a manner to selectively connect the conductors carrying the input voltage $V_{ac\_in}$ and the output voltage $V_{ac\_out}$ to the nodes/voltage levels V1–V5. Switching devices Csp1–Csp4 and Csn1–Csn4 within network 201 connect nodes V1–V5 to the input voltage $V_{ac\_in}$ to charge capacitors C1–C4, while switching devices Isp1–Isp4 and Isn1–Isn4 within network 202 connect nodes V1–V5 to the output voltage $V_{ac\_out}$ to product the appropriate output voltage level during respective portions of each cycle. The reverse-bias intrinsic diodes within each IGBT act as clamping devices constraining the voltages passed to or from nodes V1–V5 to the respective voltage levels.

The output voltage levels or nodes V1–V5 and the corresponding necessary control signal/switching device states for the switching devices within networks 201 and 202 to connect a respective input or output voltage $V_{ac\_in}$ or $V_{ac\_out}$ to that voltage level or node V1–V5 are summarized below in TABLE I (where a logical "1" indicates that the respective control signal and switching device are asserted and on, while a logical "0" indicates that the respective control signal and switching device are not asserted and off):

TABLE I

| Output Voltage | Csp1/ Isp1 | Csp2/ Isp2 | Csp3/ Isp3 | Csp4/ Isp4 | Csn1/ Isn1 | Csn2/ Isn2 | Csn3/ Isn3 | Csn4/ Isn4 |
|---|---|---|---|---|---|---|---|---|
| V1 | 0 | 0 | 0 | 0 | 1 | 1 | 0 | 1 |
| V2 | 0 | 0 | 0 | 0 | 1 | 1 | 1 | 0 |
| V3 | 1 | 0 | 0 | 0 | 1 | 0 | 0 | 0 |
| V4 | 1 | 1 | 1 | 0 | 0 | 0 | 0 | 0 |
| V5 | 1 | 1 | 0 | 1 | 0 | 0 | 0 | 0 |

Switching network 201 within circuit 200 operates as a converter (a regulated rectifier) while switching network 202 operates as an inverter. Switching networks 201 and 202 operate in exactly the same manner and provide similar waveforms. However, counterpart switching devices within networks 201 and 202 (i.e., switching device Csp1 within network 201 and switching device Isp1 within network 202, etc.) need not—and in most cases generally will not—be switched at the same instant; instead, switching networks 201 and 202 may be operated independently, but in concert, to produce the stepped sinusoidal output voltage $V_{ac\_out}$ for one power phase (A, B or C). Thus, switching network 201 operates at the frequency of the input voltage $V_{ac\_in}$ with one set of switching angles $\theta_{1\_c}$ and $\theta_{2\_c}$ and switching network 202 operates at the frequency of the output voltage $V_{ac\_out}$ with a different set of switching angles $\theta_{1\_i}$ and $\theta_{2\_i}$.

As reflected in TABLE I, taken in conjunction with FIGS. 2 and 3, switching devices Csp1/Isp1 and Csn1/Isn1 within each network 201 and 202, together with diodes D1 and D2, connect the conductors carrying the input voltage $V_{ac\_in}$ and the output voltage $V_{ac\_out}$ to node V3 during the following portions of each (respective) cycle: from the start of the cycle to the point corresponding to switching angle $\theta_{1\_c}/\theta_{1\_i}$; between the points corresponding to $\pi-\theta_{1\_c}/\theta_{1\_i}$ and $\pi+\theta_{1\_c}/\theta_{1\_i}$; and from the point corresponding to $2\pi-\theta_{1\_c}/\theta_{1\_i}$ to the end of the respective cycle.

Switching devices Csp1/Isp1, Csp2/Isp2 and Csp3/Isp3 within each network 201 and 202 connect the conductors carrying the input voltage $V_{ac\_in}$ and the output voltage $V_{ac\_out}$ to node V4 during the portions of each respective cycle from $\theta_{1\_c}/\theta_{1\_i}$ to $\theta_{2\_c}/\theta_{2\_i}$ and $\pi-\theta_{2\_c}/\theta_{2\_i}$ to $\pi-\theta_{1\_c}/\theta_{1\_i}$. Switching devices Csp1/Isp1, Csp2/Isp2 and Csp4/Isp4 within each network 201 and 202 connect the conductors carrying the input voltage $V_{ac\_in}$ and the output voltage $V_{ac\_out}$ to node V4 during the portion of each cycle from $\theta_{2\_c}/\theta_{2\_i}$ to $\pi-\theta_{2\_c}/\theta_{2\_i}$.

Switching devices Csn1/Isn1, Csn2/Isn2 and Csn3/Isn3 within each network 201 and 202 connect the conductors carrying the input voltage $V_{ac\_in}$ and the output voltage $V_{ac\_out}$ to node V2 during the portions of each cycle from $\pi+\theta_{1\_c}/\theta_{1\_i}$ to $\pi+\theta_{2\_c}/\theta_{2\_i}$ and $2\pi-\theta_{2\_c}/\theta_{2\_i}$ to $2\pi-\theta_{1\_c}/\theta_{1\_i}$. Switching devices Csn1/Isn1, Csn2/Isn2 and Csn4/Isn4 within each network 201 and 202 connect the conductors carrying the input voltage $V_{ac\_in}$ and the output voltage $V_{ac\_out}$ to node V1 during the portion of each cycle from $\pi+\theta_{2\_c}/\theta_{2\_i}$ to $2\pi-\theta_{2\_c}/\theta_{2\_i}$.

The number of voltage levels employed, together with the number of switching angles employed, may be greater than the five voltage levels V1–V5 (e.g., seven, nine, etc.) total and two switching angles (e.g., three, four, etc.) per switching network illustrated in the exemplary embodiment, and/or the voltage levels selected need not be uniformly spaced (i.e., varying in integer unit increments) as shown.

Circuit 200 has a low part count since discrete clamping diodes are not required for each voltage level and/or multiple, series-connected, discrete diodes of a given rating as needed to handle the appropriate voltage. In addition, the output voltage $V_{ac\_out}$ exhibits relatively low harmonics, such that expensive and complex sine wave filters are not required. In addition, the system of the present invention may be scaled to medium voltage (1,500 to 15,000 volts) power transmission without the requirement for a step-up transformer.

Control of circuit 200 may optionally be optimized for load balancing and minimization of harmonics by appropriate selection of switching angles $\theta_{1\_c}/\theta_{1\_i}$ and $\theta_{2\_c}/\theta_{2\_i}$. For the purposes of such optimization, a modulation index MI may be defined as a ratio of the maximum desired output voltage magnitude (set based on the target operating speed) for a switching network 201 or 202 to the maximum output voltage obtainable from that switching network—that is, the desired magnitude of voltage level V1/V5 to the maximum obtainable voltage level V1/V5 for switching network or converter 201, and the desired magnitude of the output voltage $V_{ac\_out}$ to the maximum obtainable output voltage for switching network or inverter 202.

The converter (switching network 201) within circuit 200 should provide approximately the same output voltage magnitude as the power source, and therefore the modulation index of the converter (MI_c) will generally fall within a narrow range—for instance, from 0.8 to 1.0, depending on the power source voltage—but need not necessarily be so limited. However, the inverter (switching network 202) within circuit 200 needs to provide variable voltage, with a modulation index MI_i varying from 0.1 to 1.0 depending on the desired motor speed. Both the converter and the inverter have two switching angles: $\theta_{1\_c}$ and $\theta_{2\_c}$ for the converter and $\theta_{1\_i}$ and $\theta_{2\_i}$ for the inverter.

The switching angles to balance voltages and minimize harmonic content of the input and output voltages may be initially calculated and optimized by intensive off-line calculation and simulation. Further simulation of operation under load conditions may then be performed to balance the voltage by controlling the power factor on input for correction, to obtain the optimal switching angles for one voltage-balanced operation point. By repeating this procedure, optimal switching angles for all needed operation points (different modulation index values) may be obtained.

For the system depicted in FIGS. 1–3 and described above, with a modulation index of the converter MI_c=0.9, the optimal initial switching angles (in degrees) for various selected values of the modulation index of the inverter (MI_i) are given below in TABLE II:

TABLE II

| MI_I | $\theta_{1-c}$ | $\theta_{2-c}$ | $\theta_{1-i}$ | $\theta_{2-i}$ |
|---|---|---|---|---|
| 1.0000 | 0.4510 | 0.4510 | 0.0000 | 0.0000 |
| 0.9750 | 0.3948 | 0.5014 | 0.0000 | 0.3176 |
| 0.9500 | 0.3259 | 0.5498 | 0.0000 | 0.4510 |
| 0.9250 | 0.2330 | 0.5970 | 0.0000 | 0.5548 |
| 0.9000 | 0.1550 | 0.6233 | 0.1550 | 0.6233 |
| 0.8750 | 0.1053 | 0.6342 | 0.2582 | 0.6711 |
| 0.8500 | 0.0899 | 0.6367 | 0.3463 | 0.7085 |
| 0.8250 | 0.1035 | 0.6345 | 0.4232 | 0.7403 |
| 0.8000 | 0.1201 | 0.6314 | 0.4897 | 0.7706 |
| 0.7750 | 0.1295 | 0.6294 | 0.5474 | 0.8009 |
| 0.7500 | 0.1320 | 0.6289 | 0.5987 | 0.8313 |
| 0.7250 | 0.1308 | 0.6291 | 0.6457 | 0.8615 |
| 0.7000 | 0.1285 | 0.6296 | 0.6898 | 0.8910 |
| 0.6750 | 0.1273 | 0.6299 | 0.7319 | 0.9197 |

TABLE II-continued

| MI_I | $\theta_{1-c}$ | $\theta_{2-c}$ | $\theta_{1-i}$ | $\theta_{2-i}$ |
|---|---|---|---|---|
| 0.6500 | 0.1281 | 0.6297 | 0.7723 | 0.9475 |
| 0.6250 | 0.1309 | 0.6291 | 0.8114 | 0.9746 |
| 0.6000 | 0.1350 | 0.6282 | 0.8492 | 1.0011 |
| 0.5750 | 0.1395 | 0.6271 | 0.8858 | 1.0271 |
| 0.5500 | 0.1439 | 0.6261 | 0.9213 | 1.0527 |
| 0.5250 | 0.1474 | 0.6252 | 0.9557 | 1.0781 |
| 0.5000 | 0.1499 | 0.6246 | 0.9892 | 1.1033 |
| 0.4750 | 0.1513 | 0.6242 | 1.0219 | 1.1282 |
| 0.4500 | 0.1518 | 0.6241 | 1.0538 | 1.1530 |
| 0.4250 | 0.1515 | 0.6241 | 1.0851 | 1.1775 |
| 0.4000 | 0.1509 | 0.6243 | 1.1159 | 1.2019 |
| 0.3750 | 0.1503 | 0.6245 | 1.1462 | 1.2260 |
| 0.3500 | 0.1498 | 0.6246 | 1.1761 | 1.2499 |
| 0.3250 | 0.1495 | 0.6247 | 1.2057 | 1.2735 |
| 0.3000 | 0.1497 | 0.6246 | 1.2349 | 1.2970 |
| 0.2750 | 0.1501 | 0.6245 | 1.2639 | 1.3203 |
| 0.2500 | 0.1509 | 0.6243 | 1.2926 | 1.3435 |
| 0.2250 | 0.1517 | 0.6241 | 1.3211 | 1.3665 |
| 0.2000 | 0.1526 | 0.6239 | 1.3493 | 1.3894 |
| 0.1750 | 0.1533 | 0.6237 | 1.3774 | 1.4123 |
| 0.1500 | 0.1540 | 0.6235 | 1.4053 | 1.4351 |
| 0.1250 | 0.1544 | 0.6234 | 1.4331 | 1.4578 |
| 0.1000 | 0.1547 | 0.6233 | 1.4608 | 1.4805 |
| 0.0750 | 0.1549 | 0.6233 | 1.4884 | 1.5031 |
| 0.0500 | 0.1549 | 0.6233 | 1.5159 | 1.5257 |
| 0.0250 | 0.1550 | 0.6233 | 1.5433 | 1.5482 |
| 0.0000 | 0.1549 | 0.6233 | 1.5708 | 1.5708 |

Figure 4:
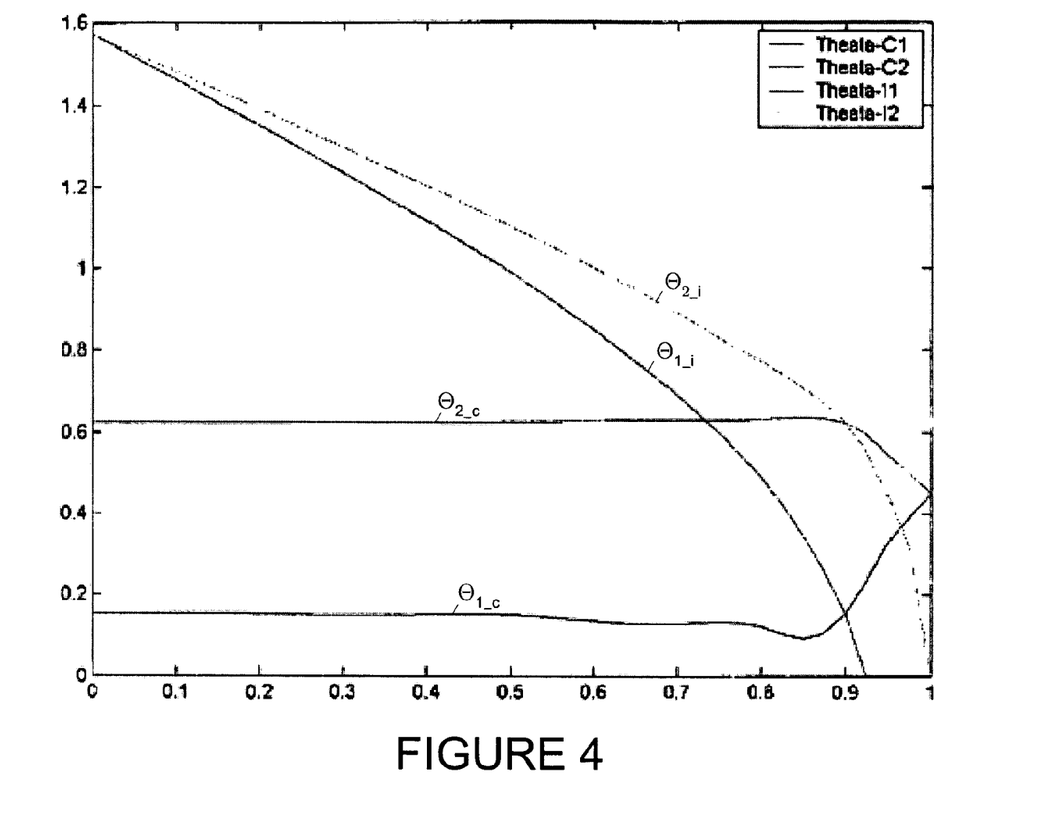
FIG. 4 is a plot of optimal initial switching angles as a function of modulation index for converter/inverter switching networks according to one embodiment of the present invention.

Optimal initial switching angles under the same conditions are also plotted in FIG. 4.

Figure 5:
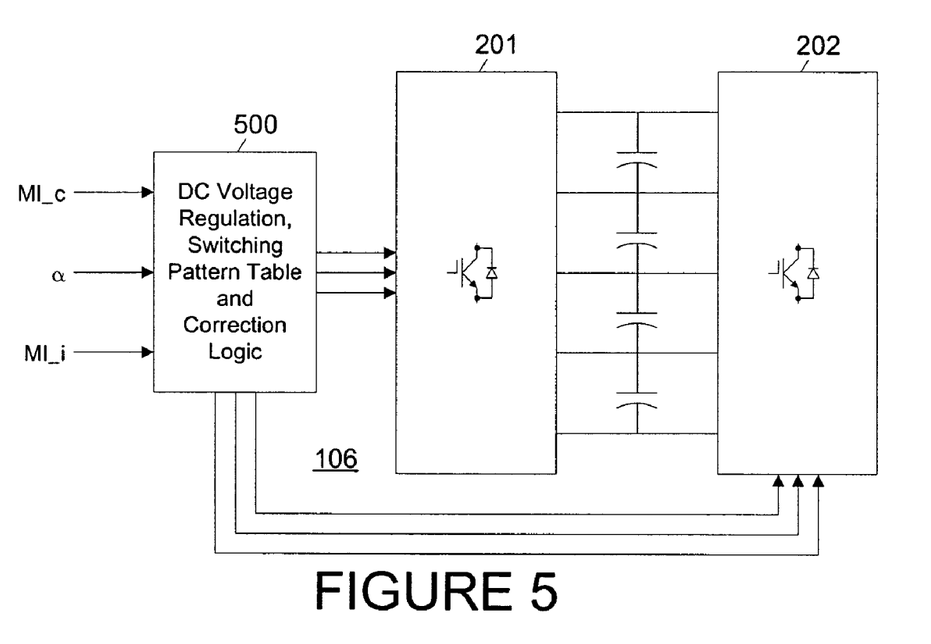
FIG. 5 is a diagram of a control system for converter/inverter switching networks according to one embodiment of the present invention.

FIG. 5 is a diagram of a control system for converter/inverter switching networks according to one embodiment of the present invention. Based on source reactive current calculations, a phase a between the power source voltage $V_{ac\_in}$ and the voltage received by converter 201 (i.e., the phase difference across inductor 203 in the example shown) is determined and employed by direct current (DC) voltage regulation portion of controller 500 to regulate the DC voltage across the capacitors C1–C4. Modulation index MI_c and modulation index MI_i are employed, by the switching pattern table and control logic within controller 500, to compute (or select from a table such as that in TABLE II) switching angles for converter 201 and inverter 202, with corrections. Modulation index MI_c is employed by controller 500 to control the power factor on the power source, while modulation index MI_i is employed to control the output voltage.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A low harmonic converter/inverter comprising:
    a plurality of series-connected electrical energy storage devices coupled between a plurality of nodes;
    a first network of switching devices selectively connecting a sinusoidal input voltage to different ones of the plurality of nodes during different portions of an input voltage cycle; and
    a second network of switching devices selectively connecting an output to different ones of the plurality of nodes during different portions of an output voltage cycle to produce a stepped sinusoidal output voltage,
    wherein the first and second networks of switching devices each comprise:
        a set of series-connected switching devices between end nodes within the plurality of nodes and
        one or more switching devices connected between a node within the plurality of nodes and a junction between two of the series-connected switching devices.

2. The converter/inverter according to claim 1, wherein the switching devices within the first and second networks are switched at selected switching angles within respective input and output voltage cycles, the switching angles for the first switching network selected from switching angles corresponding to a first predetermined range of modulation indices for the first switching network and the switching angles for the second switching network selected from switching angles corresponding to a second predetermined range of modulation indices for the second switching network.

3. The converter/inverter according to claim 2, wherein the switching angles are selected from a plurality of alternative sets of switching angles based on a desired speed of a load driven at least in part by the output voltage, and wherein the first predetermined range of modulation indices for the first switching network is from 0.8 to 1.0 and the second predetermined range of modulation indices for the second switching network is from 0.1 to 1.0.

4. The converter/inverter according to claim 3, wherein the switching angles are selected based on a modulation index for one or both of the first and second networks that most closely produces the desired speed while at least partially balancing voltages in a three phase power system including the first and second switching networks and controlling harmonic content of the input and output voltages.

5. The converter/inverter according to claim 1, wherein the switching devices each comprise an insulated gate bipolar transistor with an intrinsic diode connected with reverse bias orientation across an anode and a cathode thereof, and wherein each of the first and second networks further comprises:
    a series of switching devices, an anode of a first switching device within the series connected to a first one of the plurality of nodes;
    a switching device connecting a junction between first and second switching devices within the series to a second one of the plurality of nodes;
    first and second diodes connected in parallel with third and fourth switching devices within the series, an input or output voltage conductor connected to a junction between the third and fourth switching devices and a junction between the diodes connected to a third one of the plurality of nodes;

a switching device connecting a junction between fifth and sixth switching devices within the series to a fourth one of the plurality of nodes, wherein a cathode of the sixth switching device is connected to a fifth one of the plurality of nodes.

6. A converter/inverter system including a converter/inverter according to claim 1 for each of three phases.

7. A borehole production system including the converter/inverter system according to claim 6, the borehole production system further comprising:

an electrical submersible pump and motor assembly disposed within a borehole;

a power cable coupling the converter/inverter system to the electrical submersible pump and motor assembly; and a power source supplying three phase power to the converter/inverter system.

8. A method of operating a low harmonic converter/inverter comprising:

selectively connecting a sinusoidal input voltage to different ones of a plurality of nodes during different portions of an input voltage cycle, wherein a plurality of series-connected electrical energy storage devices are coupled between the nodes; and selectively connecting an output to different ones of the plurality of nodes during different portions of an output voltage cycle to produce a stepped sinusoidal output voltage, wherein selected nodes are connected to the input voltage during the portions of the input voltage cycle by a first network of switching devices receiving the input voltage and coupled to the nodes, and selected nodes are connected to the output during the portions of the output voltage cycle by a second network of switching devices coupled to the output and the nodes, and wherein the first and second networks of switching devices each comprise:

a set of series-connected switching devices between end nodes within the plurality of nodes and one or more switching devices connected between a node within the plurality of nodes and a junction between two of the series-connected switching devices.

9. The method according to claim 8, wherein the portions of the input voltage cycle during which selected nodes are connected to the input voltage correspond to a first predetermined range of modulation indices for the first network of switching devices receiving the input voltage and coupled to the nodes, and wherein the portions of the output voltage cycle during which selected nodes are connected to the output correspond to a second predetermined range of modulation indices for a second network of switching devices coupled to the output and the nodes.

10. The method according to claim 9, further comprising:

selecting the switching angles from a plurality of alternative sets of switching angles based on a desired speed of a load driven at least in part by the output voltage; and selecting switching angles within the input voltage cycle corresponding to a modulation index of between 0.8 and 1.0 for the first network of switching devices and switching angles within the output voltage cycle corresponding to a modulation index of between 0.1 and 1.0.

11. The method according to claim 10, further comprising:

selecting the switching angles based on a modulation index for one or both of the first and second networks of switching devices that most closely produces the desired speed while at least partially balancing voltages in a three phase power system including the first and second networks of switching devices and controlling harmonic content of the input and output voltages.

12. The method according to claim 9, wherein the switching devices each comprise an insulated gate bipolar transistor with an intrinsic diode connected with reverse bias orientation across an anode and a cathode thereof, and wherein each of the first and second networks further comprises:

a series of the switching devices, an anode of a first switching device within the series connected to a first one of the plurality of nodes;

one of the switching devices connecting a junction between first and second switching devices within the series to a second one of the plurality of nodes;

first and second diodes connected in parallel with third and fourth switching devices within the series, an input or output voltage conductor connected to a junction between the third and fourth switching devices and a junction between the diodes connected to a third one of the plurality of nodes;

another of the switching devices connecting a junction between fifth and sixth switching devices within the series to a fourth one of the plurality of nodes, wherein a cathode of the sixth switching device is connected to a fifth one of the plurality of nodes.

13. The converter/inverter according to claim 1, wherein the first and second networks of switching devices each have only two diodes in addition to the diodes intrinsic to the switching devices.

14. A method of controlling a converter/inverter comprising:

selecting switching angles within input and output voltage cycles for switching signals controlling switching devices within first and second networks of switching devices, the first network of switching devices selectively connecting a sinusoidal input voltage to different ones of a plurality of nodes during different portions of the input voltage cycle, wherein a plurality of series-connected electrical energy storage devices are coupled between the nodes, and the second network of switching devices selectively connecting an output to different ones of the plurality of nodes during different portions of an output voltage cycle to produce a stepped sinusoidal output voltages, wherein the first and second networks of switching devices each comprise:

a set of series-connected switching devices between end nodes within the plurality of nodes and one or more switching devices connected between a node within the plurality of nodes and a junction between two of the series-connected switching devices.

15. The method according to claim 14, further comprising:

selecting a plurality of alternative sets of switching angles based on a desired speed of a load driven at least in part by the output voltage, wherein the selected switching angles within the input voltage cycle correspond to a first predetermined range of modulation indices for the first network of switching devices, and wherein the selected switching angles within the output voltage cycle correspond to a second predetermined range of modulation indices for the second network of switching devices.

16. The method according to claim 14, further comprising:

selecting the switching angles within the input voltage cycle from switching angles corresponding to a modulation index of between 0.8 and 1.0 for the first network of switching devices and selecting the switching angles within the output voltage cycle from switching angles corresponding to a modulation index of between 0.1 and 1.0 for the second network of switching devices.

17. A machine usable medium containing machine instructions comprising a program that, when executed, performs the method according to claim 14.

18. A system for controlling a converter/inverter including a plurality of series-connected electrical energy storage devices coupled between a plurality of nodes, a first network of switching devices selectively connecting a sinusoidal input voltage to different ones of the plurality of nodes during different portions of an input voltage cycle, a second network of switching devices selectively connecting an output to different ones of the plurality of nodes during different portions of an output voltage cycle to produce a stepped sinusoidal output voltage, the system comprising:

a controller that, when operable, receives a desired speed of a load driven at least in part by the output voltage and selects, from a plurality of alternative sets of switching angles based upon the desired speed, switching angles within the input and output voltage cycles at which switching devices within the first and second networks are switched to produce the output voltage, wherein the first and second networks of switching devices each comprise:

a set of series-connected switching devices between end nodes within the plurality of nodes and one or more switching devices connected between a node within the plurality of nodes and a junction between two of the series-connected switching devices.

19. The system according to claim 18, wherein the controller regulates voltages across the electrical energy storage devices based upon a phase measurement relating to operation of one of the first and second switching networks relative to the input voltage, wherein the selected switching angles within the input voltage cycle correspond to a first predetermined range of modulation indices for the first network of switching devices, and wherein the selected switching angles within the output voltage cycle correspond to a second predetermined range of modulation indices for the second network of switching devices.

20. The system according to claim 18, wherein the controller communicates the selected switching angles to the first and second networks of switching devices.

21. A machine usable medium containing machine instructions comprising a program that, when executed, implements the controller within the system according to claim 18.

22. A borehole production system, comprising:

an electrical submersible pump located within a borehole;

one or more power conductors extending from a surface location into the borehole and coupled to the electrical submersible pump;

a power system at the surface location including an inverter comprising first and second networks of switching devices, the inverter receiving pulse width modulated input power and producing stepped sinusoidal output power, the power system coupled to the one or more power conductors and transmitting power on the one or more power conductors into the borehole.

* * * * *